(12) United States Patent
Khan et al.

(10) Patent No.: US 12,517,908 B2
(45) Date of Patent: Jan. 6, 2026

(54) SYSTEMS AND METHODS FOR SCALABLE OFF-CHAIN STORAGE OF BLOCKCHAIN-SECURED DATA

(71) Applicant: Verizon Patent and Licensing Inc., Basking Ridge, NJ (US)

(72) Inventors: Ahmed A. Khan, Plano, TX (US); Rasmi Ranjan Samal, Hyderabad (IN); Rangesh Sripathi, Chennai (IN); Abdul Raheem, Irving, TX (US); Mohammed A. Qaudeer, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 414 days.

(21) Appl. No.: 17/567,028

(22) Filed: Dec. 31, 2021

(65) Prior Publication Data

US 2023/0214392 A1 Jul. 6, 2023

(51) Int. Cl.
*G06F 16/2455* (2019.01)
*G06F 16/22* (2019.01)

(52) U.S. Cl.
CPC ...... *G06F 16/2455* (2019.01); *G06F 16/2255* (2019.01)

(58) Field of Classification Search
CPC .......................... G06F 16/2455; G06F 16/2255
USPC ........................................................ 707/769
See application file for complete search history.

(56) References Cited

U.S. PATENT DOCUMENTS

| 10,198,325 | B2 * | 2/2019 | Davis | G06F 16/9014 |
|---|---|---|---|---|
| 10,204,341 | B2 * | 2/2019 | Davis | G06F 16/2255 |
| 10,554,753 | B2 * | 2/2020 | Tormasov | H04L 41/5019 |
| 10,778,445 | B1 * | 9/2020 | Feng | H04L 9/3247 |
| 10,785,035 | B1 * | 9/2020 | Lv | G06F 16/2379 |
| 11,196,542 | B2 * | 12/2021 | Natarajan | H04L 9/3239 |
| 11,308,448 | B1 * | 4/2022 | Knas | G06Q 10/105 |
| 11,403,273 | B1 * | 8/2022 | Burgmeier | G06F 16/2237 |
| 11,436,614 | B2 * | 9/2022 | Hasegawa | G06K 7/1417 |
| 2017/0126702 | A1 * | 5/2017 | Krishnamurthy | G06F 21/604 |
| 2017/0344435 | A1 * | 11/2017 | Davis | H04L 9/3239 |
| 2017/0364552 | A1 * | 12/2017 | Pattanaik | H04L 9/3239 |
| 2017/0366516 | A1 * | 12/2017 | Pattanaik | H04L 9/3236 |
| 2018/0121923 | A1 * | 5/2018 | Uhr | G06Q 20/223 |
| 2018/0276666 | A1 * | 9/2018 | Haldenby | H04L 9/3268 |
| 2018/0349621 | A1 * | 12/2018 | Schvey | H04L 9/3236 |
| 2019/0005087 | A1 * | 1/2019 | Pattanaik | G06F 16/2365 |
| 2019/0014176 | A1 * | 1/2019 | Tormasov | H04L 63/123 |
| 2019/0087506 | A1 * | 3/2019 | Choh | G06F 16/951 |
| 2019/0138401 | A1 * | 5/2019 | Davis | G06F 16/9535 |

(Continued)

*Primary Examiner* — Hanh B Thai

(57) ABSTRACT

A system described herein may generate a hash value based on a set of data stored in an off-chain repository. The system may record an association between the set of data and the hash value to a blockchain system, receive a query from a client device, determine that the query is associated with the set of data, output a response to the query based on the set of data. The response may include the hash value. The system may authenticate the query (e.g., the client device) using one or more suitable authentication mechanisms, thus securing access to the set of data. The client device may verify the set of data based on determining that the hash value included in the response matches the hash value recorded to the blockchain system as being associated with the set of data.

20 Claims, 9 Drawing Sheets

(56) References Cited

U.S. PATENT DOCUMENTS

| | | | |
|---|---|---|---|
| 2019/0139043 A1* | 5/2019 | Davis | G06F 16/2246 |
| 2019/0288847 A1* | 9/2019 | Beckmann | G06F 16/2246 |
| 2019/0305958 A1* | 10/2019 | Qiu | G06Q 20/389 |
| 2020/0007316 A1* | 1/2020 | Krishnamacharya | H04L 63/126 |
| 2020/0019545 A1* | 1/2020 | Ye | G06F 16/2255 |
| 2020/0065298 A1* | 2/2020 | Pattanaik | G06F 16/2255 |
| 2020/0067907 A1* | 2/2020 | Avetisov | H04L 67/133 |
| 2020/0074059 A1* | 3/2020 | Beckett, Jr. | G06F 21/36 |
| 2020/0127826 A1* | 4/2020 | Ebrahimi | G06F 21/32 |
| 2020/0137090 A1* | 4/2020 | Holzhauer | H04L 63/1416 |
| 2020/0167771 A1* | 5/2020 | Ye | H04L 9/3239 |
| 2020/0177390 A1* | 6/2020 | Yang | H04L 9/3236 |
| 2020/0183883 A1* | 6/2020 | Yang | G06F 21/645 |
| 2020/0193430 A1* | 6/2020 | Jiang | G06Q 20/3827 |
| 2020/0202041 A1* | 6/2020 | Li | H04L 9/3247 |
| 2020/0210275 A1* | 7/2020 | Zhou | H04L 9/3239 |
| 2020/0267163 A1* | 8/2020 | Wilson | H04L 9/3271 |
| 2020/0311646 A1* | 10/2020 | Koenig | H04L 9/3297 |
| 2020/0313903 A1* | 10/2020 | Yu | H04L 9/3073 |
| 2020/0320085 A1* | 10/2020 | Wang | G06F 16/27 |
| 2020/0336297 A1* | 10/2020 | Zhuo | G06F 16/2379 |
| 2020/0344042 A1* | 10/2020 | Hwang | G06F 16/2246 |
| 2020/0349651 A1* | 11/2020 | Grube | G06Q 20/3827 |
| 2020/0349653 A1* | 11/2020 | Grube | G06Q 20/3825 |
| 2020/0372043 A1* | 11/2020 | Aseev | G06F 21/64 |
| 2020/0382279 A1* | 12/2020 | Jayachandran | G06F 16/1834 |
| 2020/0382280 A1* | 12/2020 | Jayachandran | G06Q 20/382 |
| 2020/0382309 A1* | 12/2020 | Jayachandran | H04L 9/3297 |
| 2020/0382310 A1* | 12/2020 | Jayachandran | H04L 9/3239 |
| 2021/0049066 A1* | 2/2021 | Lu | H04L 9/3239 |
| 2021/0109917 A1* | 4/2021 | Xiao | G06F 16/2255 |
| 2021/0152357 A1* | 5/2021 | Wang | H04L 9/321 |
| 2021/0250299 A1* | 8/2021 | Liu | H04L 47/125 |
| 2021/0263083 A1* | 8/2021 | Hwang | G06Q 50/06 |
| 2021/0336793 A1* | 10/2021 | Nishijima | H04L 9/3239 |
| 2022/0058198 A1* | 2/2022 | Dupont | G06F 21/602 |
| 2022/0103367 A1* | 3/2022 | Yalagandula | G06F 16/2255 |
| 2022/0147502 A1* | 5/2022 | Chu | G06F 16/2255 |
| 2022/0237695 A1* | 7/2022 | Hwang | G06Q 20/3825 |

* cited by examiner

SYSTEMS AND METHODS FOR SCALABLE OFF-CHAIN STORAGE OF BLOCKCHAIN-SECURED DATA

BACKGROUND

Blockchains provide for the decentralized and secure storage of data. Blockchains may further provide for the immutability of recorded data, as data may not be altered once recorded to a blockchain. Organizations may store relatively large amounts of data, such as operational data, user data, etc.

DETAILED DESCRIPTION OF EXAMPLE EMBODIMENTS

The following detailed description refers to the accompanying drawings. The same reference numbers in different drawings may identify the same or similar elements.

Embodiments described herein provide for the use of a blockchain system to provide a secure mechanism by which off-chain data (e.g., data stored in a system other than the blockchain system) may be verified. The off-chain data may be stored in one or more repositories, servers, datacenters, etc. In this manner, the data itself may be securely stored, and access to the data may be controlled by one or more authentication policies or mechanisms that are separate from the blockchain system. As such, an owner, provider, etc. of the data may be able to have granular control of how the data is accessed, stored, etc. Further, since the data is stored off-chain, the size or amount of data may be significantly greater than the amounts of data that may be feasibly stored in a blockchain system (e.g., where such feasibility may be related to congestion of the blockchain system, relatively high transaction fees associated with storing relatively large amounts of data to the blockchain system, etc.). As such, the amount of data that may be securely and verifiably stored in accordance with some embodiments may be highly scalable. As discussed below, characteristics of the blockchain system, such as the immutability and decentralized trust provided by the blockchain system, may be leveraged to provide such characteristics to the off-chain data, without needing to store the data itself to the blockchain system.

Figure 1:
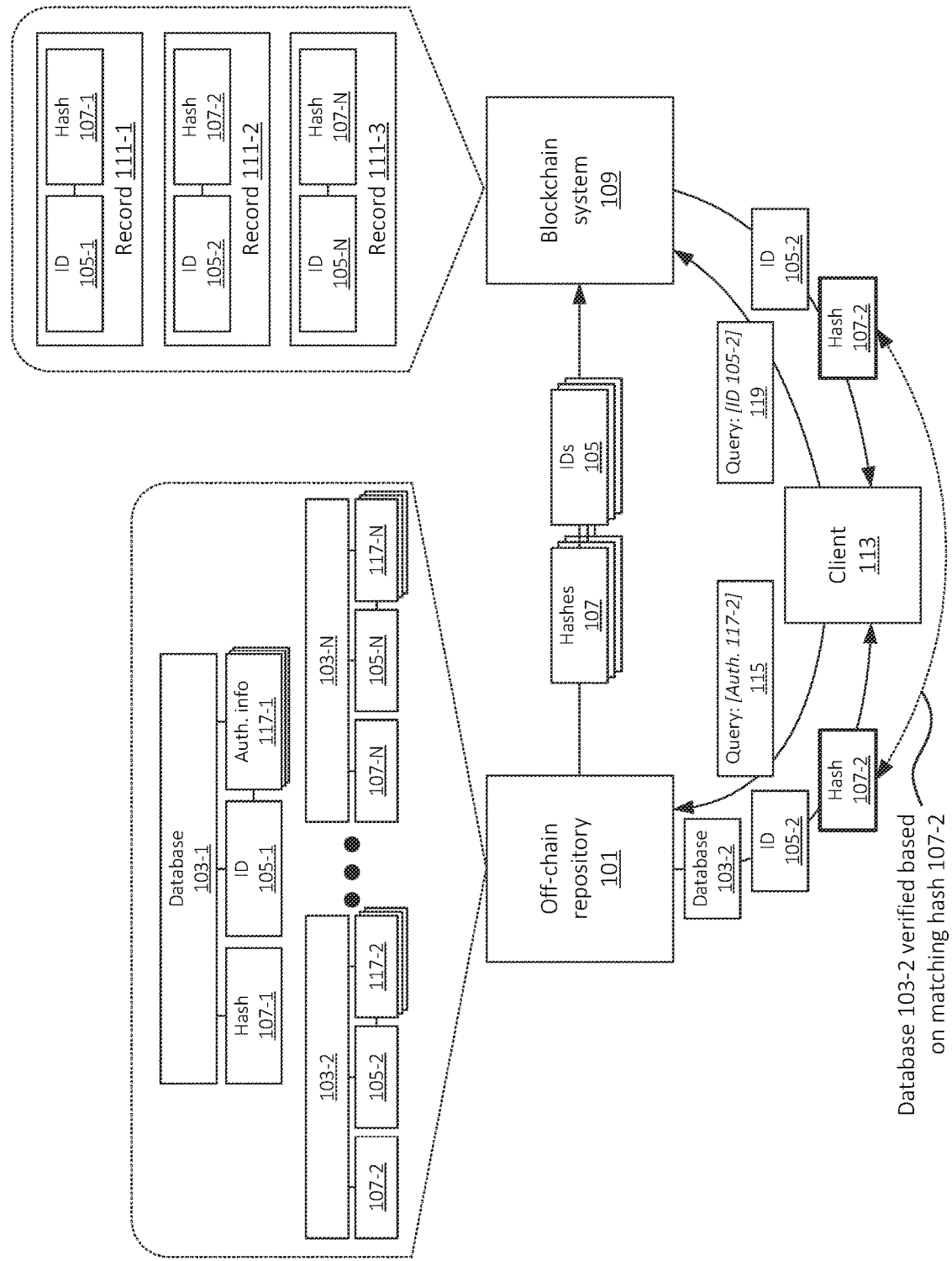
FIG. 1 illustrates an example overview of one or more embodiments described herein.

As shown in FIG. 1, for example, off-chain repository 101 may maintain one or more databases 103 (e.g., database 103-1, database 103-2, database 103-N, etc.). Although the term "database" is used herein to refer to data stored by off-chain repository 101, in practice, similar concepts may apply to any suitable arrangement of data, such as data structures, tables, records, etc. As shown, each particular database 103 may be associated with a respective unique identifier ("ID") 105.

Each database 103 may be associated with a respective hash value 107. For example, a particular hash 107 associated with a particular database 103 may be generated by performing (e.g., by off-chain repository 101 and/or some other suitable device or system) one or more cryptographic hashing functions or other suitable functions on some or all of the information stored in the particular database 103. In some embodiments, hash 107 may include, and/or may be generated based on, multiple hash values. For example, hash 107 may include a Merkle root hash value that is generated based on a Merkle tree, where different portions of the Merkle tree represent portions of database 103. While each hash 107 may include, represent, and/or may be based on multiple values (e.g., multiple intermediate hash values), hashes 107 are described herein in the context of each representing a single hash value, for the sake of simplicity. As discussed below, off-chain repository 101 and/or some other device or system may generate respective hash values 107 for a given database 103 when database 103 is generated and/or modified.

Off-chain repository 101 may represent, may include, may be implemented by, and/or may be communicatively coupled to one or more data centers, servers, Multi-Access/Mobile Edge Computing ("MEC") devices (referred to sometimes herein simply as "MECs"), or other suitable devices or systems that perform one or more operations described herein. Off-chain repository 101 may implement one or more portals, interfaces, application programming interface ("APIs"), or other suitable communication pathways via which off-chain repository 101 is able to communicate with blockchain system 109. For example, off-chain repository 101 may be a node of blockchain system 109, may be communicatively coupled to one or more nodes of blockchain system 109, and/or may otherwise have access to record and/or retrieve data to and/or from blockchain system 109.

For example, off-chain repository 101 may record hashes 107 and associated IDs 105 to blockchain system 109. For example, when a particular hash 107 is generated for a particular database 103, off-chain repository 101 may record information associating the particular hash 107 with the particular database 103 to blockchain system 109. In this manner, blockchain system 109 may store a set of records 111 that associate particular IDs 105 with particular hashes 107. Each record 111 may be a block stored by blockchain system 109, and/or a single block may include multiple records 111. As shown, for example, record 111-1 includes information associating ID 105-1 with hash 107-1, record 111-2 includes information associating ID 105-2 with hash 107-2, and record 111-3 includes information associating ID 105-N with hash 107-N.

In some embodiments, off-chain repository 101 may maintain an association between a respective record 111 and ID 105 and/or hash 107. For example, when recording a particular ID 105 and hash 107 to a particular record 111 of blockchain system 109, off-chain repository 101 may determine a block ID, transaction ID, or other suitable identifier associated with record 111 of blockchain system 109 in which the association between the particular ID 105 and hash 107 was recorded.

Off-chain repository 101 may communicate with client 113 via a portal, API, or other suitable communicate pathway, in order to securely provide data associated with one or more databases 103, which client 113 may verify by communicating with blockchain system 109. For example, client 113 may provide query 115 to off-chain repository 101. The query may include one or more query terms (e.g., which may correspond to particular data stored in one or more databases 103), identifying information associated with client 113 or a user of client 113, a particular ID 105 associated with a particular database 103, or other suitable information that may be used by off-chain repository 101 to identify client 113 and/or one or more databases 103 that are associated with client 113.

Query 115 may include, or otherwise be associated with, authentication information 117. Authentication information 117 may include a user name, password, one or more authentication tokens, or other suitable information associated with an authentication mechanism via which off-chain repository 101 may authenticate client 113 or a user of client 113. Particular sets of authentication information 117 may be associated with particular databases 103 and/or IDs 105, such that a particular database 103 associated with query 115 may be identified based on information (e.g., authentication information 117) provided by client 113. In this example, query 115 may include authentication information 117-2, based on which off-chain repository 101 may identify that client 113 is authorized to access database 103-2.

By providing such authentication mechanism, off-chain repository 101 may securely maintain databases 103 by restricting access only to entities that are able to perform one or more authentication procedures in accordance with such authentication mechanism. Further, access control to databases 103 may be able to be granularly and dynamically controlled, such as on a per-user basis, a per-organization basis, etc. Further, such authentication mechanisms may be changed, updated, improved, etc. over time by an owner and/or operator of off-chain repository 101, thus giving further control and flexibility over access to data stored in databases 103 associated with off-chain repository 101.

Based on identifying that query 115 is associated with database 103-2 (e.g., that client 113 is authorized to access database 103-2), off-chain repository 101 may provide some or all of database 103-2 to client 113. For example, off-chain repository 101 may provide all information stored in database 103-2, and/or may provide some (i.e., less than all) information stored in database 103-2. In some situations, query 115 may include keywords, search terms, etc. based on which off-chain repository 101 may identify particular portions, records, etc. of database 103 that are a suitable response to query 115.

In response to query 115, off-chain repository 101 may provide the identified database 103-2 (and/or a suitable portion thereof, such as one or more records, rows, columns, etc. that are responsive to query 115), as well as hash 107-2 associated with database 103-2. For example, as discussed above, hash 107-2 may have been generated by off-chain repository 101 and/or some other device or system based on database 103-2. In some embodiments, off-chain repository 101 may provide ID 105-2 in response to query 115, thus indicating a particular database 103 (i.e., database 103-2, in this example) with which the response is associated.

In some embodiments, off-chain repository 101 may not provide database 103-2 and/or hash 107-2 to client 113 in response to query 115. For example, when responding to queries (such as query 115), off-chain repository 101 may provide only a portion of database 103 that is responsive to such queries. In some embodiments, off-chain repository 101 may provide database 103 (e.g., the entirety of database 103) and/or hash 107 based on a specific request for database 103 and/or hash 107 from client 113. In some embodiments, client 113 may generate hash 107 based on receiving database 103. In such embodiments, client 113 may not need to "trust" that hash 107, as provided by off-chain repository 101, is a correct or verifiable hash of database 103.

As further shown, client 113 may verify the integrity of the received data (e.g., of database 103) by communicating with blockchain system 109. For example, client 113 may output query 119 to blockchain system 109 and/or to some device or system that provides access to information stored in blockchain system 109 (e.g., an "explorer"). Query 119 may include ID 105 of a particular database 103 to be verified. In this example, query 119 includes ID 105-2, in a situation where client 113 is attempting to verify database 103-2 as received from off-chain repository 101.

In some embodiments, when providing the response to query 115, off-chain repository 101 may provide the block ID, transaction ID, etc. associated with record 111-2, which includes the association between ID 105-2 and hash 107-2. In such embodiments, query 119 may include a reference to such record 111-2, based on which the association between ID 105-2 and hash 107-2 may be determined (e.g., to eliminate the possibility of ambiguity in the event that multiple records 111 exist with the same ID 105-2).

Blockchain system 109 (and/or some other suitable device or system that accesses records 111 stored by blockchain system 109) may identify hash 107-2 based on ID 105-2. For example, blockchain system 109 may identify that record 111-2 includes ID 105-2 as well as hash 107-2. Blockchain system 109 may return hash 107-2 to client 113 in response to query 119. Blockchain system 109 may further provide ID 105-2, such that client 113 is able to determine that hash 107-2 is being returned in response to query 119, which includes ID 105-2.

Client 113 may further compare the hashes provided by off-chain repository 101 and blockchain system 109, associated with ID 105-2. In this example, client 113 may verify that both off-chain repository 101 and blockchain system 109 provided hash 107-2 in response to queries 115 and 119, respectively. As both hashes are the same, client 113 may verify that database 103-2 is in the same state as when off-chain repository 101 provided hash 107-2 to blockchain system 109. For example, such verification may indicate that database 103-2 has not been tampered with or altered by another entity, such as via a "man-in-the-middle" attack. Additionally, or alternatively, such verification may indicate that database 103-2 has not been altered (e.g., inadvertently) by off-chain repository 101 after hash 107-2 was provided to blockchain system 109. Further, client 113 may be able to identify a time at which hash 107-2 was recorded to blockchain system 109, which may indicate a time at which database 103-2 was generated or modified to include the data stored by database 103-2. If, on the other hand, the hashes returned by off-chain repository 101 and blockchain system 109 were different, such difference may indicate that database 103-2 has been modified (e.g., by off-chain repository 101 and/or some other entity) after hash 107-2 was recorded to blockchain system 109.

Figure 2:
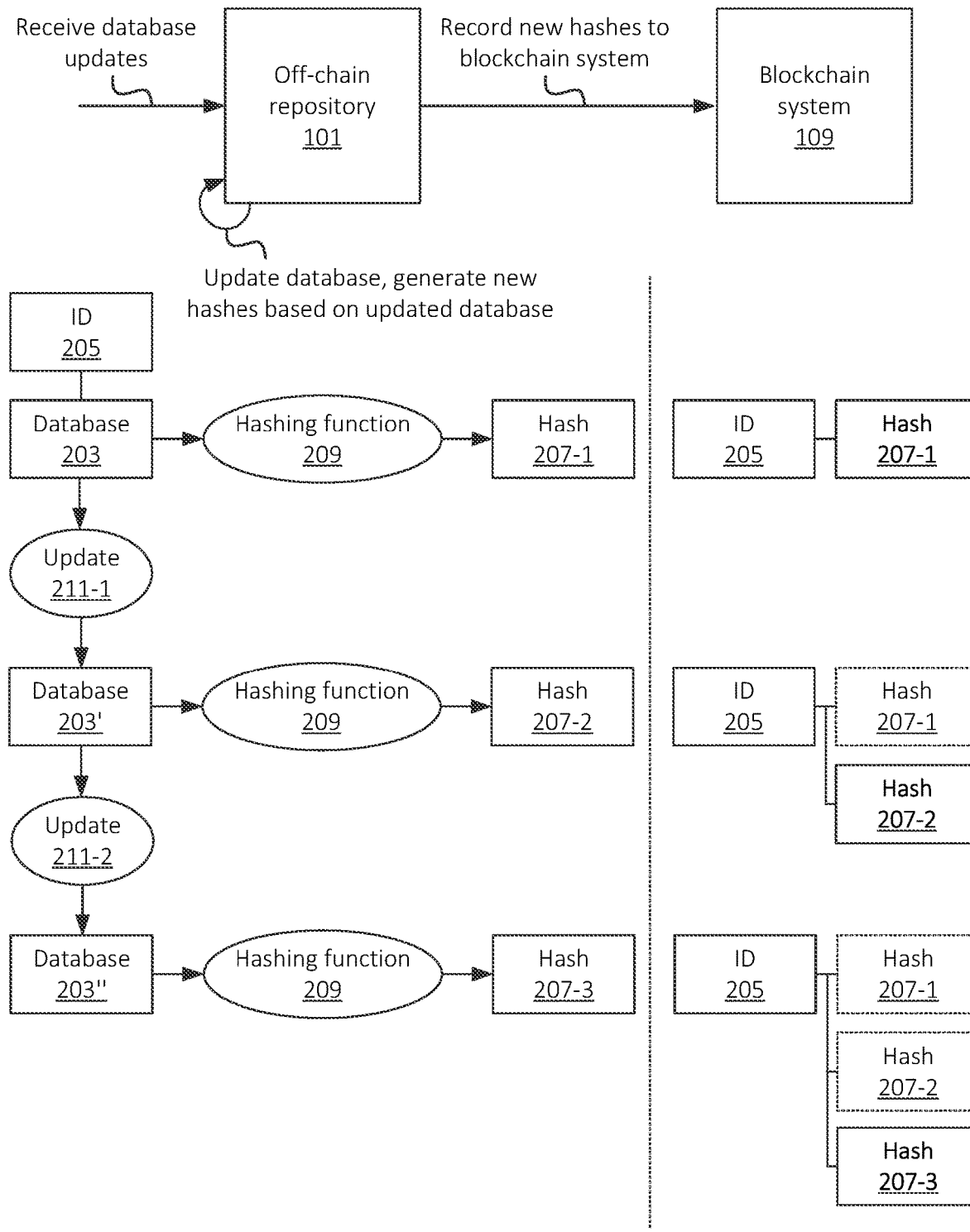
FIGS. 2 and 3 illustrates an example of hash generation and recordation, based on updates to a particular set of data, in accordance with some embodiments.

FIG. 2 illustrates an example of hash generation and recordation, based on updates to a particular database 203. As shown, off-chain repository 101 may receive updates to a particular database 203, such as modifications to data stored in database 203, modifications to an arrangement or definition of database 203, etc. In this example, assume that database 203 is associated with a particular ID 205. Off-chain repository 101 may generate a first hash hash 207-1 based on database 203. For example, off-chain repository 101 may utilize hashing function 209 to generate hash 207-1 based on database 203. Off-chain repository 101 may further record hash 207-1 to blockchain system 109, along with ID 205. In this example, assume that hash 207-1 is the first hash stored by blockchain system 109 for ID 205.

Off-chain repository 101 may further receive a first update 211-1 to database 203, such as a modification to data stored in database 203 or some other type of modification. The version of database 203, after update 211-1 has been performed, is referred to as modified database 203'. Off-chain repository 101 may perform hashing function 209 on modified database 203' to generate second hash 207-2, which may be a different value than hash 207-1. Off-chain repository 101 may further record hash 207-2, along with ID 205, to blockchain system 109. As blockchain system 109 may be immutable, blockchain system 109 may retain both hashes 207-1 and 207-2 as being associated with ID 205. Blockchain system 109 and/or some other device or system may, when responding to queries (such as query 119) for a hash 207 that is associated with a particular ID 205, identify the last recorded hash 207 with respect to the particular ID 205. Thus, while hash 207-1 may still be stored in blockchain system 109 as being associated with ID 205, hash 207-2 may be recorded as being a "latest" or an "up-to-date" hash with respect to ID 205.

As further shown, off-chain repository 101 may receive a further update 211-2 to modified database 203', where modified database 203" refers to a version of database 203 after updates 211-1 and 211-2 have been performed. Off-chain repository 101 may perform hashing function 209 on modified database 203" to generate third hash 207-3, which may be a different value than hashes 207-1 and 207-2. Off-chain repository 101 may further record hash 207-3, along with ID 205, to blockchain system 109. After such recordation, while hashes 207-1 and 207-2 may still be stored in blockchain system 109 as being associated with ID 205, hash 207-3 may be recorded as being a "latest" or an "up-to-date" hash with respect to ID 205.

As database 203 is updated (e.g., resulting in modified database 203' and modified database 203"), off-chain repository 101 may maintain an association between modified versions of database 203 and one or more clients 113, users, etc. that are authorized to access database 203 (e.g., modified versions of database 203). As such, while hashes 307 associated with database 203 change, the modified versions of database 203 may still be accessible to the same clients 113, users, etc.

In some embodiments, off-chain repository 101 may generate a new hash 207 based on database 203 without receiving updates to database 203. For example, off-chain repository 101 may generate a new hash 207 on a schedule, on an event-driven basis (e.g., in response to one or more triggering events, such as an identified security breach), and/or on some other basis that is independent of whether off-chain repository 101 has received any updates to database 203.

Figure 3:
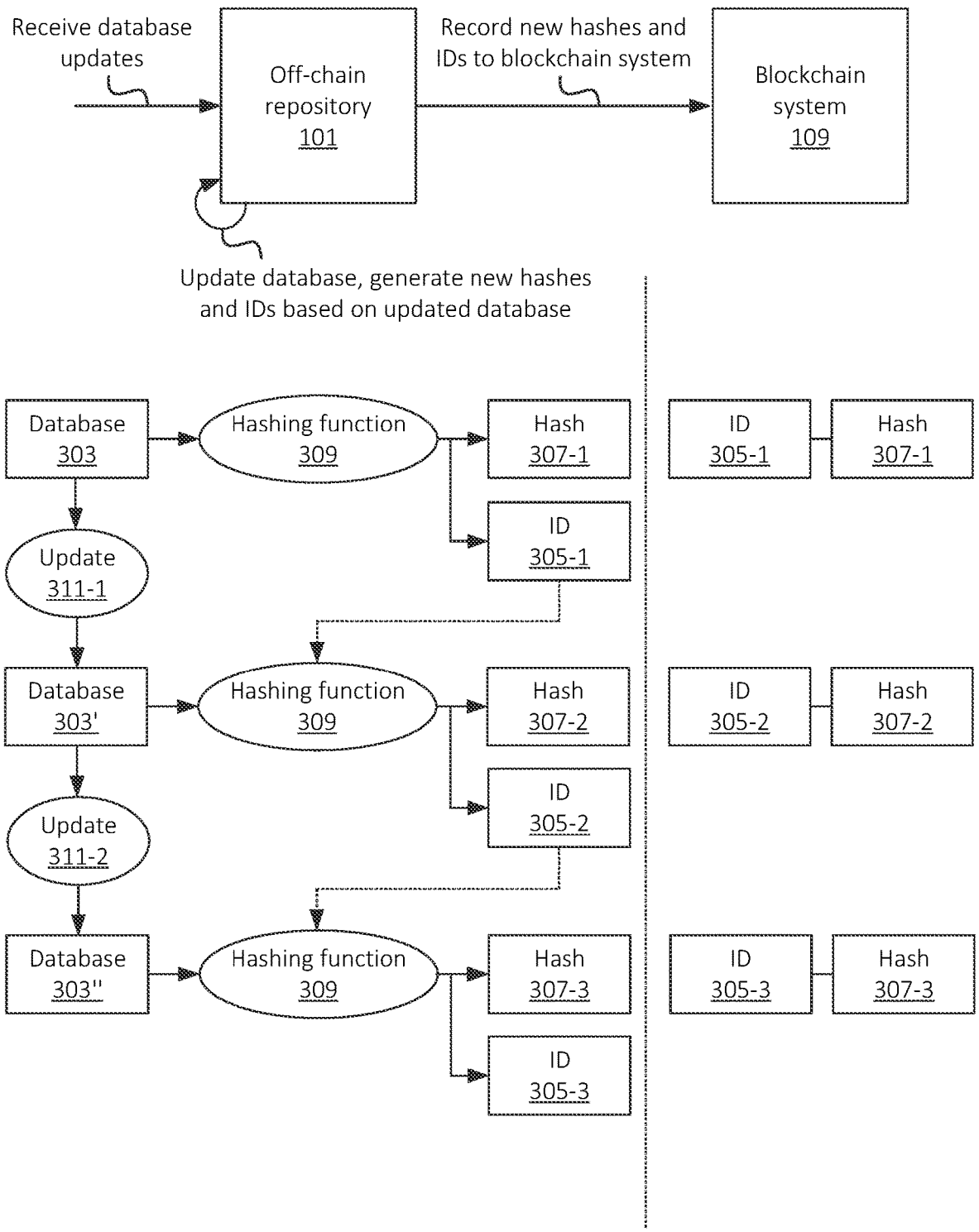

FIG. 3 illustrates another example of hash generation and recordation, based on updates to a particular database 303.

In this example, off-chain repository 101 may generate a new ID 305 each time database 303 is updated, and may record the new ID 305 to blockchain system 109 along with a corresponding hash 307. For example, off-chain repository 101 may use hashing function 309 to generate hash 307-1 based on data stored in database 303. In some embodiments, off-chain repository 101 may use hashing function 309, some other hashing function, and/or some other type of function to generate ID 305-1 for database 303. Off-chain repository 101 may further record the association between ID 305-1 and hash 307-1 to blockchain system 109. In some embodiments, off-chain repository 101 may use a different hashing function for each database 303, and/or may use a different hashing function for each iteration of generating a respective hash 307.

Off-chain repository 101 may receive update 311-1 to database 303, which may result in modified database 303'. Off-chain repository 101 may generate hash 307-2 based on modified database 303', and may further generate a new ID 305-2 that is associated with modified 303'. For example, off-chain repository 101 may generate ID 305-2 using hashing function 309 and/or some other suitable function or set of functions. In some embodiments, off-chain repository 101 may generate ID 305-2 using hashing function 309 on updated database 303' and previous ID 305-1. In this manner, previous IDs 305 may be used to identify a chain of custody and/or other measure of integrity of one or more versions of database 303. In some embodiments, updated IDs 305 may be generated independently of previous IDs 305.

Off-chain repository 101 may further record ID 305-2 and hash 307-2 to blockchain system 109. In some embodiments, blockchain system 109 may not maintain any relationship between IDs 305-1 and 305-2, between hashes 307-1 and 307-2, between ID 305-1 and hash 307-2, or between ID 305-2 and hash 307-1. In this manner, an attacker or malicious user may be unable to, or may be hindered from, reverse engineering or otherwise identifying the association between IDs 305 and hashes 307.

Off-chain repository 101 may further provide new ID 305-2 to one or more clients 113 that are authorized to access database 303. For example, off-chain repository 101 may "push" new ID 305-2 to one or more clients 113, and/or off-chain repository 101 may provide new ID 305-2 to client 113 when responding to an authorized query (e.g., query 115) from client 113. In this manner, authorized clients 113 may be kept up-to-date when a previous ID 305, associated with database 303, is replaced with a new ID 305. In some embodiments, clients 113 may discard previous IDs 305 when receiving an indication that such previous IDs 305 have been replaced with a new ID 305.

Similarly, upon further update 311-2, off-chain repository 101 may perform hashing function 309 on modified database 303" to generate hash 307-3, and may also generate ID 305-3. Off-chain repository 101 may record the association between ID 305-3 and hash 307-3 to blockchain system 109. Additionally, off-chain repository 101 may provide updated ID 305-3 to clients 113 that are authorized to access database 303 (e.g., modified database 303").

Figure 4:
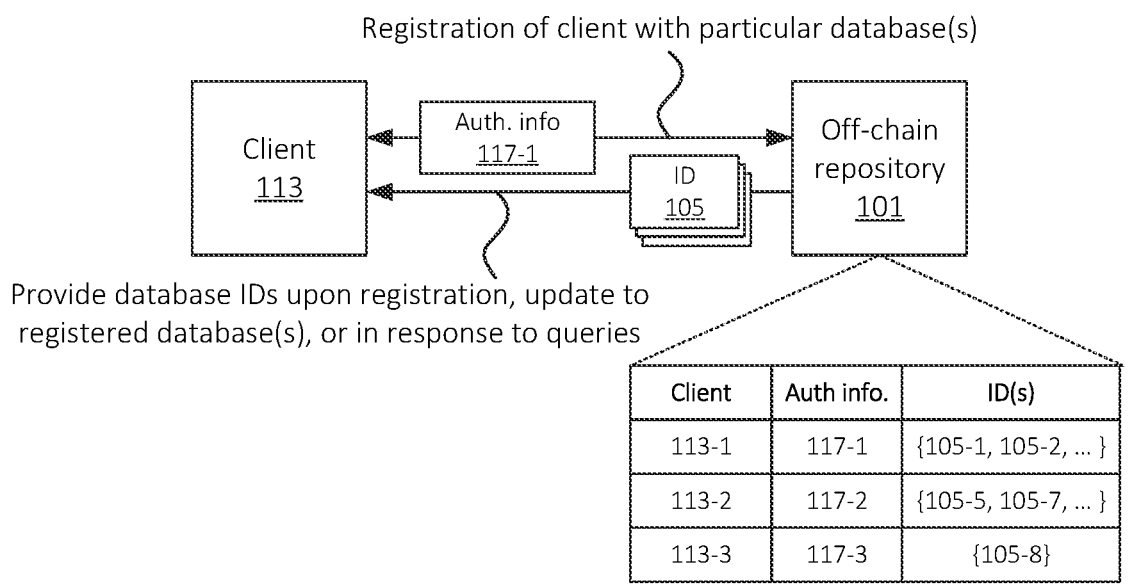
FIG. 4 illustrates an example registration procedure in accordance with some embodiments.

FIG. 4 illustrates an example registration and ID 105 update procedure associated with client 113 and off-chain repository 101. As shown, for example, client 113 and off-chain repository 101 may participate in a registration, onboarding, etc. procedure in which particular authentication information 117-1, associated with client 113, is established. As noted above, authentication information 117-1 may include any suitable authentication mechanism, such as a user name and password, the generation and/or exchange of one or more authentication tokens and/or keys, or the like. The registration procedure may further include specifying which particular databases 103 that client 113 is authorized to access. Off-chain repository 101 may determine IDs 105 with which such particular databases 103 are associated. IDs 105 may have been previously generated, or off-chain repository 101 may generate a particular ID 105 based on registering client 113. In this manner, the same database 103 may be associated with multiple IDs 105. For example, a particular ID 105 may be associated with a particular database 103 and one or more clients 113. The association of the same database 103 with multiple IDs 105 may allow for group access control, such that access to a particular database 103 may be granted or revoked on a per-group basis. Further, the same client 113 may have access to multiple databases 103, and may thus receive and/or otherwise be associated with multiple IDs 105. As noted above, off-chain repository 101 may provide one or more IDs 105, with which client 113 is associated, as part of the registration procedure, based on receiving one or more updates to one or more databases 103 with which client 113 is associated, and/or in response to queries from client 113.

In some embodiments, off-chain repository 101 may provide information regarding hashing function 309, used by off-chain repository 101 to generate one or more hashes 107, to client 113. For example, off-chain repository 101 may indicate a particular type of hashing function 309, parameters of such hashing function 309, etc., based on which off-chain repository 101 may perform the same hashing function 309 to generate the same hashes 107 generated by off-chain repository 101 based on particular databases 103. Off-chain repository 101 may provide information regarding hashing function 309 as part of the registration procedure and/or based on an update procedure associated with database 103, as described above.

Figure 5A:
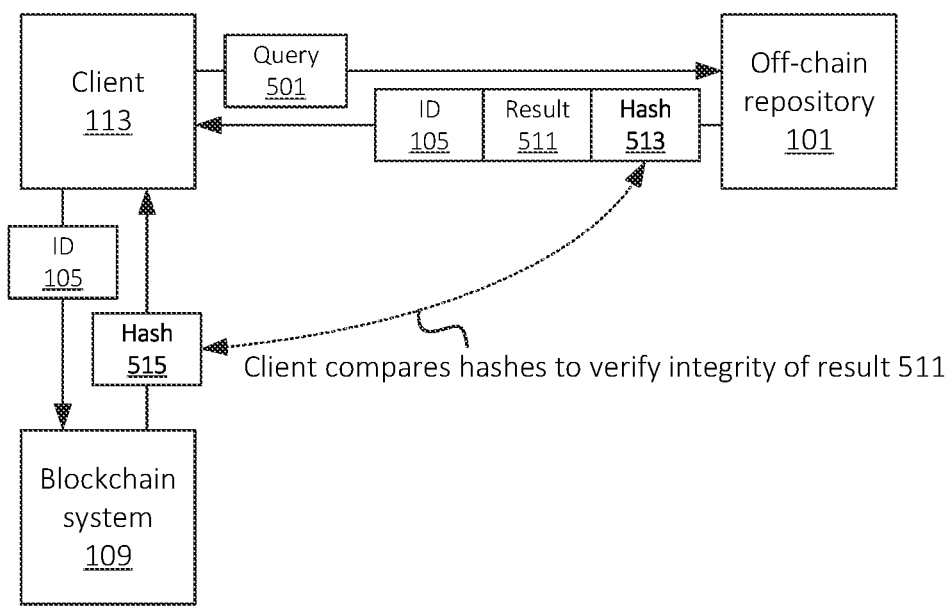
FIGS. 5A and 5B illustrate examples of the secure retrieval of data from an off-chain repository as well as the verification of such data by communicating with a blockchain system, in accordance with some embodiments.
Figure 5B:
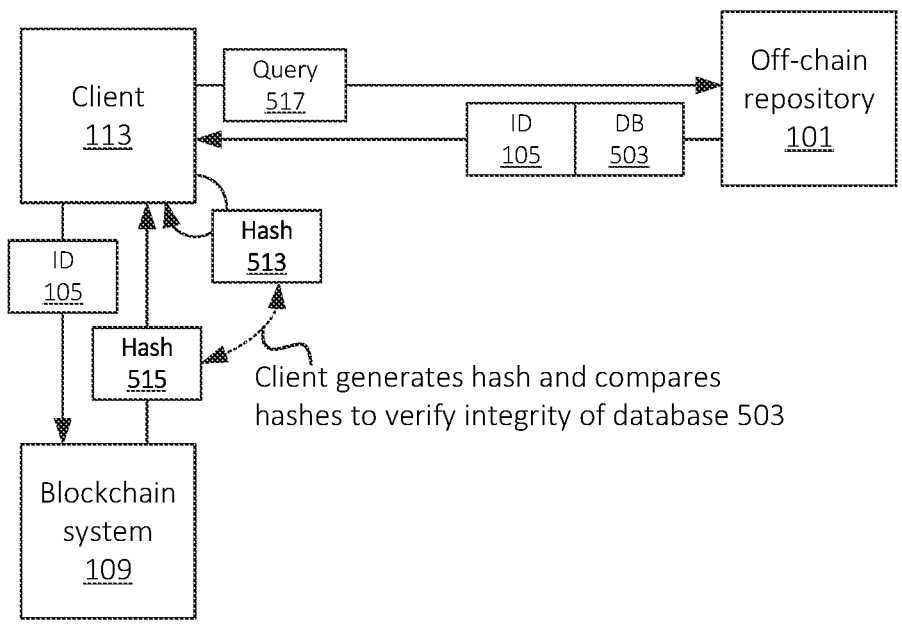

FIGS. 5A and 5B provide examples of the retrieval of data, by client 113, from off-chain repository 101 as well as the verification of such data by communicating with blockchain system 109. As shown in FIG. 5A, client 113 may output query 501 to off-chain repository 101. As similarly discussed above, query 501 may include an identifier of client 113, an identifier 105 of one or more databases 103 with which client 113 is authorized to access, authentication information 117, and/or some other information based on which off-chain repository 101 is able to identify a particular database 103 with which query 501 is associated.

Off-chain repository 101 may return result 511, which may include some or all of a particular database 103 that has been identified based on query 501 (e.g., matching criteria specified in query 501 as well as client 113 being authorized to access database 103). Off-chain repository 101 may further provide hash 513 with result 511, which may be associated with database 103 from which result 511 was identified. Additionally, or alternatively, off-chain repository 101 may provide hash 513 to client 113 as part of a separate procedure. Additionally, or alternatively, or client 113 may generate hash 513 based on result 511 (e.g., when result 511 includes database 103 from which result 511 was identified), or may generate hash 513 based on database 103 from which result 511 was identified (e.g., off-chain repository 101 may provide the full database 103 with result 511 or as part of a separate procedure).

Client 113 may further query blockchain system 109 based on ID 105, and blockchain system 109 may return hash 515 in response to such query. Client 113 may compare hash 513, received from off-chain repository 101, to hash 515 received from blockchain system 109. If hash 513 matches hash 515, then client 113 may be able to verify the integrity of result 511 (e.g., that result 511 is associated with a version of database 103 for which hash 513/515 was recorded to blockchain system 109). If, on the other hand, hash 513 does not match hash 515, client 113 may be able to determine that result 511 has been compromised and/or is invalid in some way.

As shown in FIG. 5B, off-chain repository 101 may return database 503, along with a corresponding ID 105, to client 113 in response to query 517. In some embodiments, query 517 may specify that the full database 503 is being requested. In some embodiments, query 517 may be part of a verification procedure, by which client 113 verifies the integrity of database 503 stored by off-chain repository 101. In some embodiments, database 503 may be returned independent of whether query 517 includes a request for the full database 503.

Client 113 may generate hash 513 based on database 503. For example, client 113 may use the same hashing function or functions (e.g., hashing function 309) as used by off-chain repository 101, as described above. For example, client 113 may communicate with off-chain repository 101 or some other device or system to receive information regarding the hashing function or functions used by off-chain repository 101, parameters of such hashing function or functions, or other suitable information that facilitates the generation of hash 513 by client 113.

Client 113 may further communicate with blockchain system 109 to obtain hash 515, recorded to blockchain system 109 as being associated with ID 105. Client 113 may verify the integrity of database 503 based on comparing hash 513, generated by client 113, to hash 515 recorded to blockchain system 109.

Figure 6:
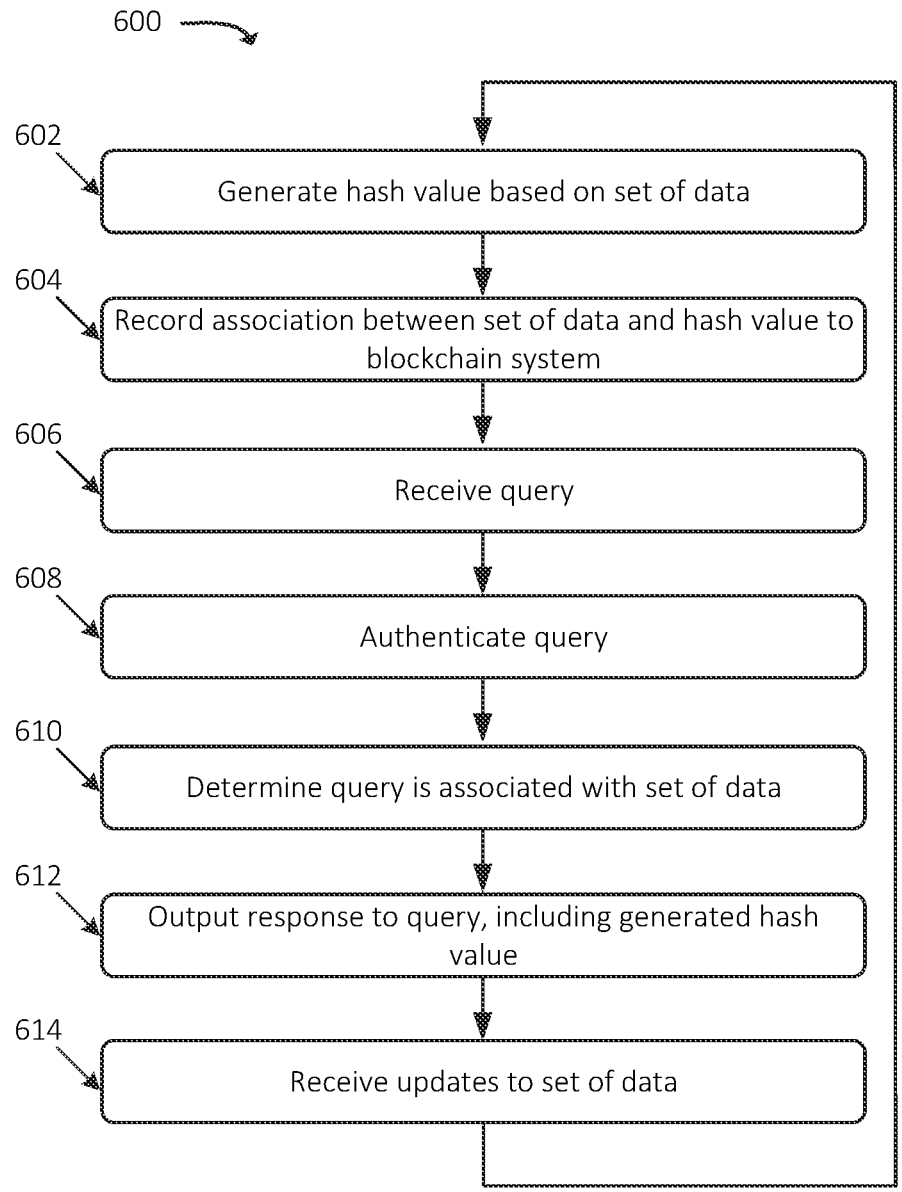
FIG. 6 illustrates an example process for securely providing verifiable off-chain data, in accordance with some embodiments.

FIG. 6 illustrates an example process 600 for securely providing verifiable off-chain data, in accordance with some embodiments. In some embodiments, some or all of process 600 may be performed by off-chain repository 101. In some embodiments, one or more other devices may perform some or all of process 600 in concert with, and/or in lieu of, off-chain repository 101.

As shown, process 600 may include generating (at 602) a hash value based on a set of data. A "set of data," as referred to with respect to this figure, may refer to database 103 and/or some other suitable set of data. As discussed above, off-chain repository 101 may utilize one or more hashing functions 309 to generate hash 107 based on the set of data, which may include a table, one or more records, a database, etc. The hash value may include a Merkle root value or other suitable hash value generated based on the set of data.

Process 600 may further include recording (at 604) an association between the set of data and the hash value to a blockchain system. For example, off-chain repository 101 may be or may communicate with one or more nodes of blockchain system 109 in order to record an association between the set of data (e.g., an identifier associated with the set of data) and the generated (at 602) hash value to blockchain system 109. In some embodiments, off-chain repository 101 may receive or determine an identifier of a block, record, etc. of blockchain system 109 in which the association is stored.

Process 600 may additionally include receiving (at 606) a query. For example, off-chain repository 101 may receive such query from client 113, which may have been previously registered with off-chain repository 101. Process 600 may also include authenticating (at 608) the query. For example, the query may include suitable authentication information, such as a user name, one or more authentication tokens, etc. that may have been established during a registration or onboarding procedure between off-chain repository 101 and client 113.

Process 600 may further include determining (at 610) that the query is associated with the set of data. For example, off-chain repository 101 may maintain multiple sets of data with multiple associated hash values, and off-chain repository 101 may determine with which particular set of data the query is associated. For example, off-chain repository 101 may determine that a client 113 from which the query was received is associated with one or more particular sets of data, the query may include an identifier of the particular set of data, etc. In some embodiments, off-chain repository 101 may determine a particular subset of the set of data that is associated with the query (e.g., a particular row, column, record, etc.).

Process 600 may additionally include outputting (at 612) a response to the query, including the generated hash value. For example, off-chain repository 101 may provide the set of data and/or a suitable portion thereof to client 113. Off-chain repository 101 may also provide the hash value associated with the set of data, which off-chain repository 101 may use to verify the integrity of the returned data. For example, as discussed above, off-chain repository 101 may determine that blockchain system 109 has previously received information associating the hash value with the set of data. In some embodiments, as discussed above, client 113 may receive the set of data from off-chain repository 101 and may generate the hash value independently.

Process 600 may also include receiving (at 614) updates to the set of data. For example, one or more values or configurations of the set of data may be changed, based on which some or all of process 600 may be repeated. As discussed above, some or all of process 600 may be repeated independently of whether any updates were received (at 614) or not, such as on a periodic or event-driven basis.

Figure 7:
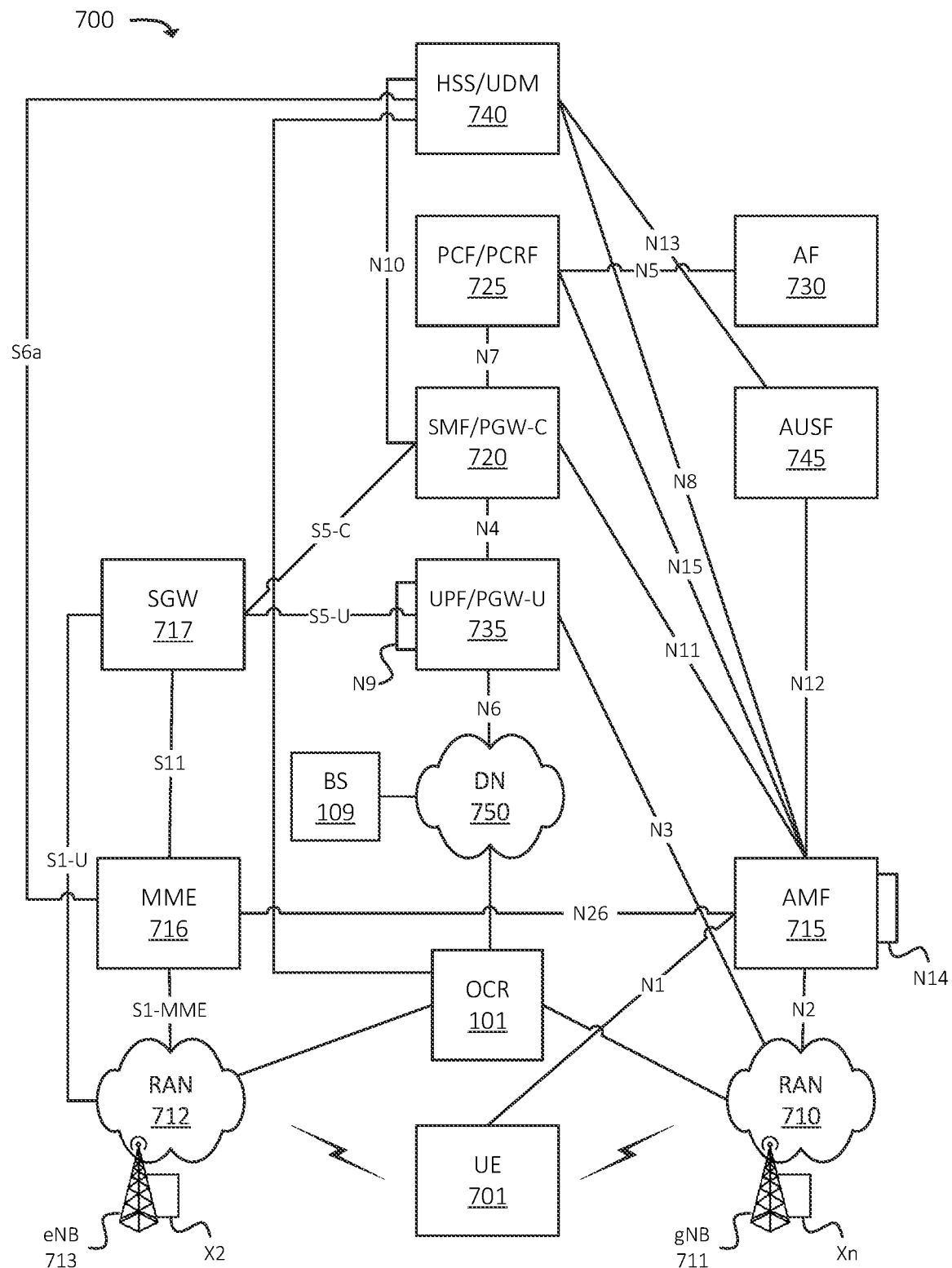
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as off-chain repository 101 and/or blockchain system 109.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 701 may send traffic to and/or receive traffic (e.g., user plane traffic) from DN 750 via RAN 710, RAN 712, and/or UPF/PGW-U 735. In some embodiments, client 113 and/or some or all of blockchain system 109 may be, may include, or may be implemented by one or more UEs 701 or other types of suitable devices or systems.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), Cloud-Native Network Functions ("CNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, CNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
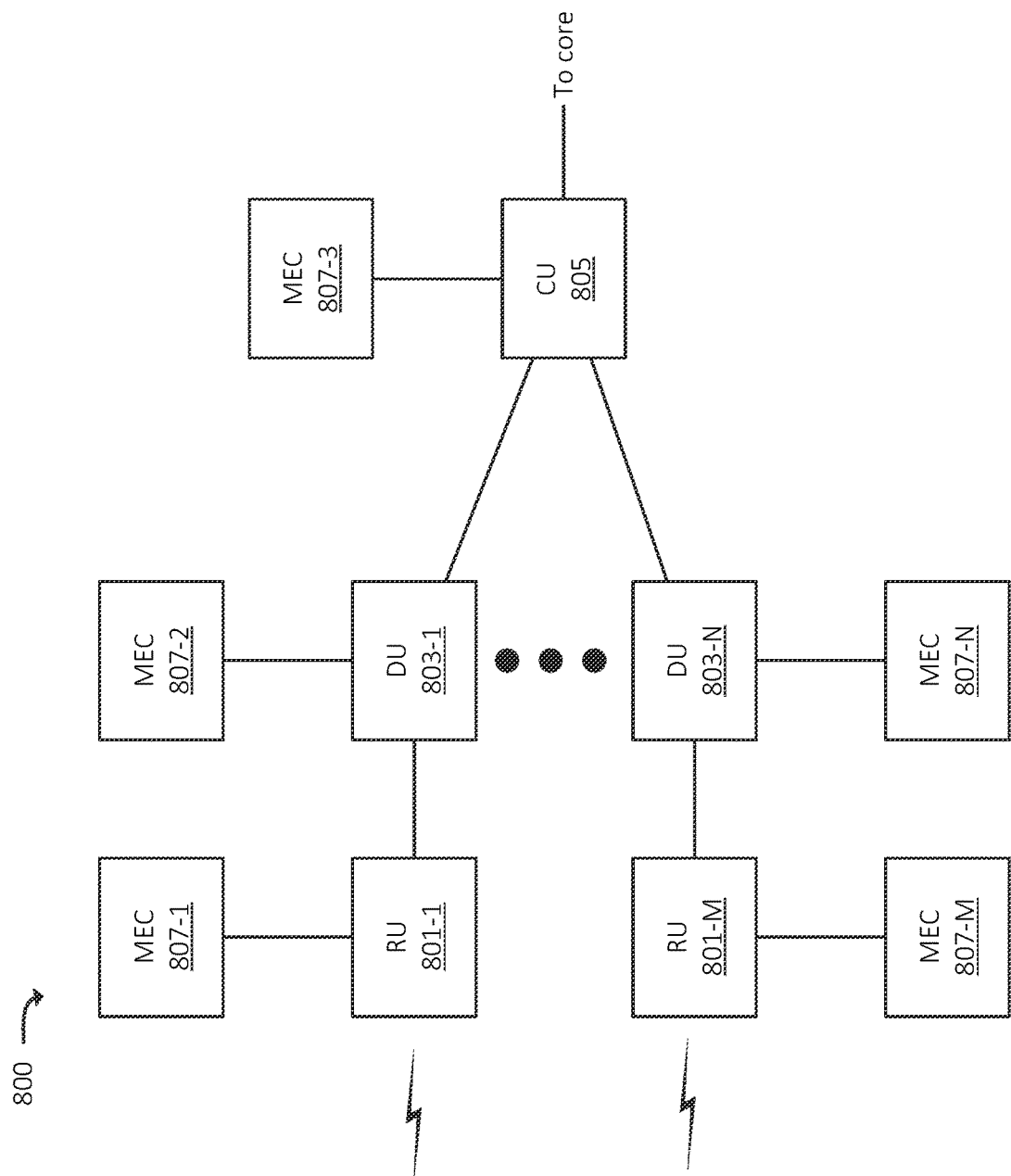
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more MECs 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement, some or all of the functionality described above with respect to off-chain repository 101.

Figure 9:
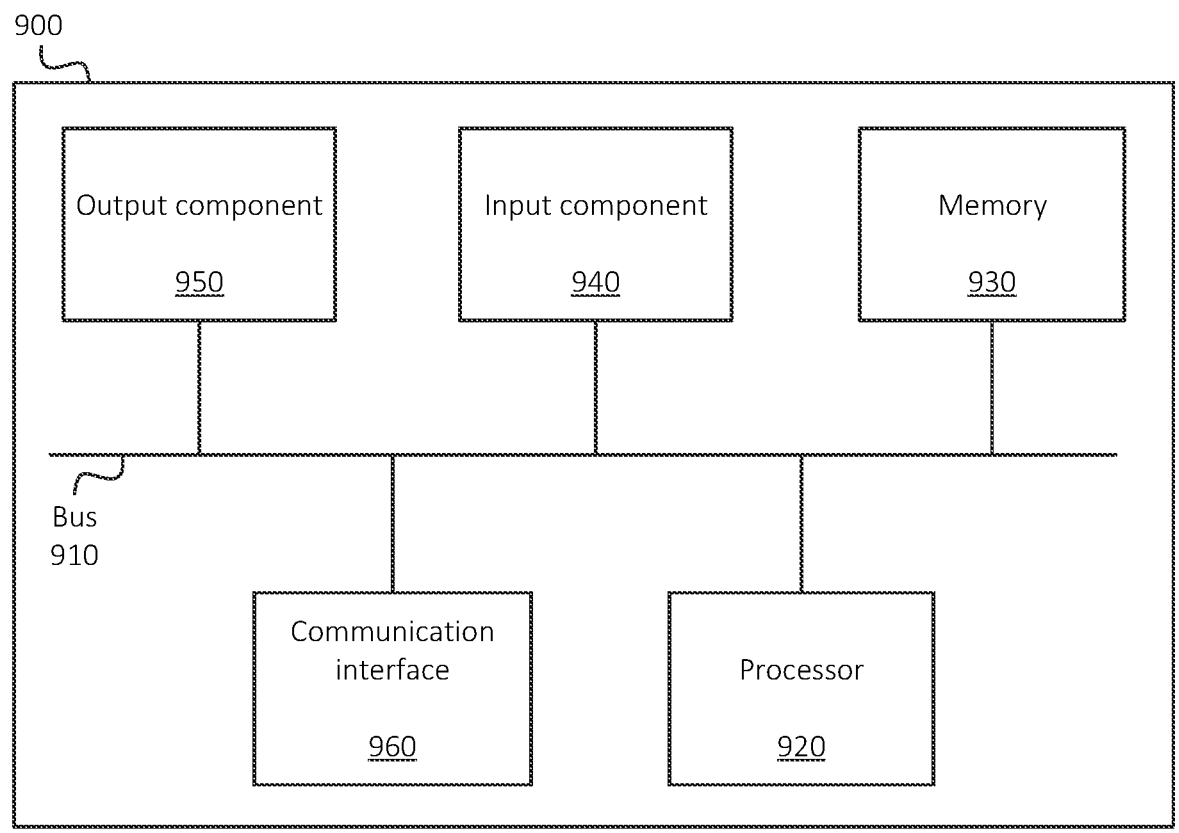
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
generate a hash value based on a set of data, wherein the set of data is associated with a particular identifier, wherein generating the hash value includes using a particular hashing function, and wherein the hash value is separate from the particular identifier;
record an association between the particular identifier and the hash value to a blockchain system;
maintain the set of data in a repository that is separate from the blockchain system;
receive a query from a client device;
determine that the query is associated with the set of data as maintained in the repository; and
output a response to the query, wherein the response includes:
the set of data, maintained in the repository, that is associated with the particular identifier,
an indication of the particular hashing function used to generate the hash value, and
the particular identifier associated with the set of data, wherein the client device uses the particular hashing function to generate the hash value based on the set of data included in the response and verifies the set of data included in the response based on determining that the hash value generated by the client device matches the hash value recorded to the blockchain system as being associated with the particular identifier.

2. The device of claim 1, wherein the hash value is a first hash value, wherein the one or more processors are further configured to:
receive an update to the set of data;
generate a second hash value based on the updated set of data; and
record an association between the set of data and the second hash value to the blockchain system.

3. The device of claim 1, wherein the one or more processors are further configured to:
authenticate the client device prior to outputting the response to the client device.

4. The device of claim 1, wherein the set of data is a first set of data, wherein the hash value is a first hash value, wherein the one or more processors are further configured to:
generate a second hash value based on a second set of data, wherein the second hash value is different from the first hash value; and
record an association between the second set of data and the second hash value to the blockchain system.

5. The device of claim 1, wherein the blockchain system is maintained by a first set of devices, and wherein the repository is maintained by a separate second set of devices.

6. The device of claim 1, wherein the hash and the particular identifier are generated by a particular set of devices that implement the repository.

7. The device of claim 1, wherein the response does not include the hash value.

8. A non-transitory computer-readable medium, storing a plurality of processor-executable instructions to:
generate a hash value based on a set of data, wherein the set of data is associated with a particular identifier, wherein generating the hash value includes using a particular hashing function, and wherein the hash value is separate from the particular identifier;

record an association between the particular identifier and the hash value to a blockchain system;

maintain the set of data in a repository that is separate from the blockchain system;

receive a query from a client device;

determine that the query is associated with the set of data as maintained in the repository; and output a response to the query, wherein the response includes:

the set of data, maintained in the repository, that is associated with the particular identifier, an indication of the particular hashing function used to generate the hash value, and the particular identifier associated with the set of data, wherein the client device uses the particular hashing function to generate the hash value based on the set of data included in the response and verifies the set of data included in the response based on determining that the hash value generated by the client device matches the hash value recorded to the blockchain system as being associated with the particular identifier.

9. The non-transitory computer-readable medium of claim 8, wherein the hash value is a first hash value, wherein the plurality of processor-executable instructions further include processor-executable instructions to:

receive an update to the set of data;

generate a second hash value based on the updated set of data; and record an association between the set of data and the second hash value to the blockchain system.

10. The non-transitory computer-readable medium of claim 8, wherein the plurality of processor-executable instructions further include processor-executable instructions to:

authenticate the client device prior to outputting the response to the client device.

11. The non-transitory computer-readable medium of claim 8, wherein the set of data is a first set of data, wherein the hash value is a first hash value, wherein the plurality of processor-executable instructions further include processor-executable instructions to:

generate a second hash value based on a second set of data, wherein the second hash value is different from the first hash value; and record an association between the second set of data and the second hash value to the blockchain system.

12. The non-transitory computer-readable medium of claim 8, wherein the blockchain system is maintained by a first set of devices, and wherein the repository is maintained by a separate second set of devices.

13. The non-transitory computer-readable medium of claim 8, wherein the response does not include the hash value.

14. A method, comprising:

generating a hash value based on a set of data, wherein the set of data is associated with a particular identifier, wherein generating the hash value includes using a particular hashing function, and wherein the hash value is separate from the particular identifier;

recording an association between the particular identifier and the hash value to a blockchain system;

maintaining the set of data in a repository that is separate from the blockchain system;

receiving a query from a client device;

determining that the query is associated with the set of data as maintained in the repository; and outputting a response to the query, wherein the response includes:

the set of data, maintained in the repository, that is associated with the particular identifier, an indication of the particular hashing function used to generate the hash value, and the particular identifier associated with the set of data, wherein the client device uses the particular hashing function to generate the hash value based on the set of data included in the response and verifies the set of data included in the response based on determining that the hash value generated by the client device matches the hash value recorded to the blockchain system as being associated with the particular identifier.

15. The method of claim 14, wherein the hash value is a first hash value, the method further comprising:

receiving an update to the set of data;

generating a second hash value based on the updated set of data; and recording an association between the set of data and the second hash value to the blockchain system.

16. The method of claim 14, further comprising:

authenticating the client device prior to outputting the response to the client device.

17. The method of claim 14, wherein the set of data is a first set of data, wherein the hash value is a first hash value, the method further comprising:

generating a second hash value based on a second set of data, wherein the second hash value is different from the first hash value; and recording an association between the second set of data and the second hash value to the blockchain system.

18. The method of claim 14, wherein the blockchain system is maintained by a first set of devices, and wherein the repository is maintained by a separate second set of devices.

19. The method of claim 14, wherein the hash and the particular identifier are generated by a particular set of devices that implement the repository.

20. The method of claim 14, wherein the response does not include the hash value.

* * * * *